June 27, 1961   B. J. AUERBACH ET AL   2,990,380
PROCESS FOR PRODUCING FOAMED RESINOUS MATERIALS
Filed Nov. 4, 1957
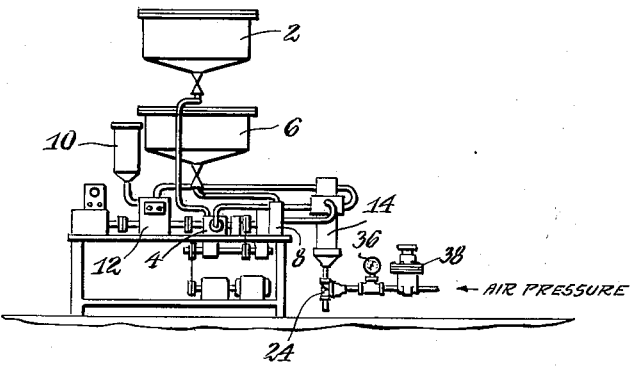
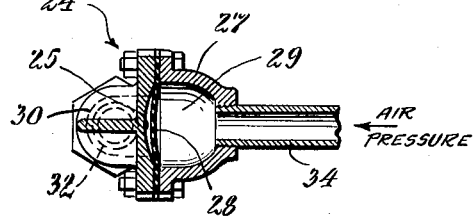
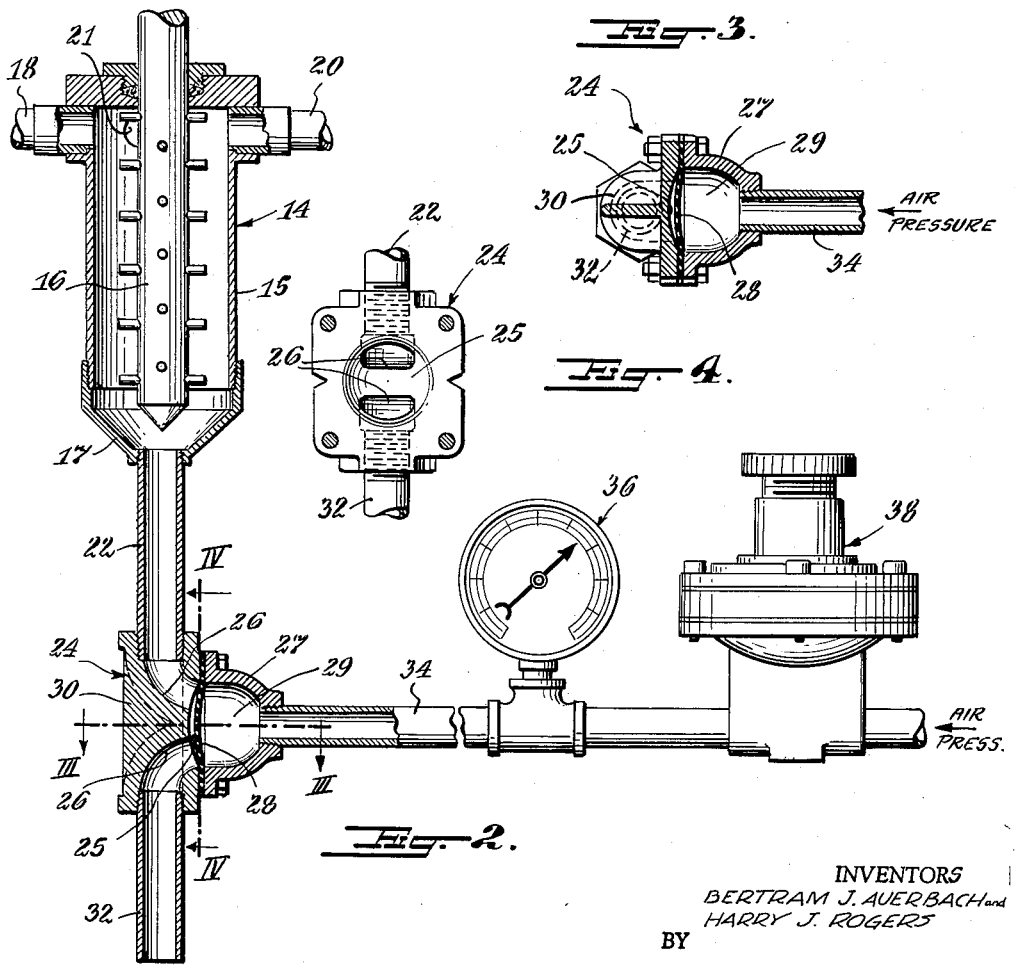
INVENTORS
BERTRAM J. AUERBACH and
HARRY J. ROGERS
BY
ANGELO M. PISARRA
ATTORNEY.

United States Patent Office 2,990,380
Patented June 27, 1961

2,990,380
PROCESS FOR PRODUCING FOAMED
RESINOUS MATERIALS
Bertram J. Auerbach, Brooklyn, N.Y., and Harry J. Rogers, West Orange, N.J., assignors to Nopco Chemical Company, Harrison, N.J., a corporation of New Jersey
Filed Nov. 4, 1957, Ser. No. 694,215
8 Claims. (Cl. 260—2.5)

The present invention relates to novel processes, a step and steps in the processes, as well as apparatus and devices employed for the production of foamed resins, and especially such resins of the polyurethane type which may be either rigid or flexible. In one of its more specific aspects the invention is directed to novel processes, a step and steps in the processes, as well as the apparatus and devices for regulating the cell size of said resins in the course of their preparation.

It is well known in the art that foamed polyurethane resins may be prepared by reacting, either in the presence or absence of catalytic material, one or a combination of two or more polyisocyanates with one or a combination of two or more organic compounds capable of reacting with a polyisocyanate to produce polyurethane resin. Such organic compounds generally have at least two reactive hydrogen atoms. Some examples of such organic compounds which may be employed in the process of and apparatus of the invention are polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc. having free reactive hydrogen atoms, free reactive carboxylic and/or especially hydroxyl groups. Moreover, any organic compound containing at least two radicals selected from the class consisting of hydroxyl and carboxyl groups may be employed in the practice of the invention.

Some of the more serious problems present in the preparation of these foamed materials have been the problems of obtaining uniform cell size and structure and of obtaining a high degree of reproducibility. These problems are present primarily apparently because of the nature of the reactants and the reaction mass and because of the almost immediate initiation of an exothermic reaction between the reactants upon admixture, the physical characteristics of the mass are changed and in addition are affected by other variations of pressure, temperature, viscosity, etc. normally encountered in factory practice. Attempts to obtain improved products have heretofore been concerned with modes of mixing the components prior to reaction. One such proposal is described in U.S. Patent No. 2,764,565, Hoppe et al., issued September 25, 1956, in which a catalyst and water are first introduced into the reactants intermittently at a high frequency thereby thoroughly mixing all the components prior to reaction. However, this procedure did not bring about complete uniformity or reproducibility to the degree desired by the industry. Accordingly, attempts to modify this procedure were made, first by chemical means, i.e., additives were put in with the raw materials, and later by mechanical means, i.e., coupling a rigid discharge tube with the mixing chamber and removing said tube and replacing it with a like tube of different diameter. However, these modifications were unsatisfactory for the reasons that the cell structure could be controlled for only short periods of time and it was therefore necessary to shut down the operation and while in shut-down condition put in extra additives, or else the rigid exit tube was replaced by a like tube of different size. Hence, these modifications because of the necessity for complete stoppages at best provided for intermittently controlled procedures. Moreover, when it was desired to produce such foamed resins having a different size cell structure, which sometimes is required in factory practice, this demanded a complete stoppage of operation followed by changing of the exit tube to one of a different diameter.

It is an object of the present invention to provide for processes, steps in such processes as well as apparatus and devices which will assure formation of uniform cell structures having a predetermined cell size in foamed polyurethane resins.

It is a further object to provide processes, steps in said processes and apparatus and devices which may be employed for effectively and economically reproducing foamed products of pre-determined cell size and structure.

Still another object of the invention is to provide processes and apparatus which may be controlled at will and without stoppage in the production of substantially uniform predetermined cell size resins whereby production is continuous and the cell size is maintained substantially constant.

Still another object of the present invention is to provide processes and apparatus which may be controlled at will in very simple and easy manner to change from the production of foamed material of particular cell size to such material of different cell size.

Still another object of the present invention is to provide processes and apparatus which may be controlled at will in a very simple and easy manner to change from the production of foamed material of particular cell size to such material of different cell size and without interruption of production or stoppage of the apparatus.

Still another object of this invention is to provide processes and apparatus including an automatically expandable and contractable zone actuable in response to variations in pressure therein in the course of passage therethrough of reacting materials and evolved gases to compensate for such variations.

Still another object of the invention is to provide processes and apparatus which may be readily and easily controlled at will by an operator to initially obtain predetermined cell size resin and to maintain continuous production thereof.

Still another object of the invention is to provide processes and apparatus which may be readily and easily controlled at will by an operator to initially obtain predetermined cell size resin and to maintain continuous production thereof despite normal variations encountered in factory production of such resins.

Still another object of this invention is to provide processes and apparatus including an automatically expandable and contractable zone actuable in response to variations in pressure therein in the course of passage therethrough of reacting materials and evolved gases to compensate for such variations, said processes and apparatus being readily and easily controlled at will by an operator to obtain initially predetermined cell size resin and to maintain continuously the production of such resin.

Reference is now made to the accompanying drawings which illustrate a novel apparatus and a novel device which may be employed in practicing the novel processes and step and steps therein of the present invention, all to be taken merely by way of illustration and not limitation.

FIG. 1 illustrates a device for storing, mixing, and reacting the several components used in preparing foamed polyurethane resins, said device including our novel diaphragm valve.

FIG. 2 is an enlarged view of a portion of the valve of FIGURE 1 and showing the valve and a mixing head in a vertical cross sectional view.

FIG. 3 is a cross sectional view taken on line III—III of FIG. 2.

FIG. 4 is a view taken on line IV—IV of FIG. 2.

Reference is now made to FIG. 1, which discloses the Hoppe et al., apparatus made part hereof, in combination with certain other elements thereby providing novel combinations of this invention. The Hoppe et al. apparatus comprises essentially a storage tank 2 carrying a quantity of polyisocyanate, tank 6 carrying a quantity of organic material capable of reacting with the polyisocyanate to produce polyurethane resin, and storage tank 10 carrying a quantity of a catalyst. The organic compound may be continuously fed from tank 6 into a mixer 14 by the action of a pump 8, while the polyisocyanate from tank 2 is simultaneously injected intermittently into said mixer 14 by means of pump 4 and the catalyst is fed from tank 10 and is injected intermittently into said mixer 14 by pump 12. As shown in FIG. 2, the mixer 14 comprises a barrel 15, fed through three inlets 18, 20 and 21 for the introduction of said three components via flexible hose from the separate storage tanks 2, 6 and 10, and an agitator 16 to aid in the mixing of such components delivered thereto. The mixture of such components, while being constantly agitated by the stirrer 16, is pressure fed downwardly through the central opening in the tapered outlet cap 17.

According to this invention, there is coupled to said outlet cap 17, means for providing a restricted passageway communicating with said chamber 15 and with means for providing a discharge passageway whereby the material fed from the mixer 14 passes through said restricted passageway and then through said discharge passageway. In the course of the mixing of the reactants in mixer 14 and the travel thereof into and through said restricted passageway and into and through said discharge passageway, reaction between the reactants is initiated and occurs and gaseous $CO_2$ is evolved, and the resultant gaseous $CO_2$ laden liquid mass is discharged into a conveyor wherein it sets into a foamed resin. Said restricted passageway or zone is formed by hollow means, at least a portion of which is movable relative to another portion thereof whereby the size of said passageway or zone may be increased or decreased. Associated with said hollow means is adjustable means capable of acting upon said movable portion for moving said movable portion at will to increase or decrease the size or cross sectional area of said restricted passageway or zone. Said portion of said means which is movable with respect to another portion thereof may be of a great variety of different compositions, structures, shapes and forms. In one of its aspects, it is preferable that said movable portion be flexible, resilient and elastic or otherwise designed so that it is also movable in response to variations in pressure within said restricted zone or passageway.

While various devices and constructions may be employed for the aforesaid purposes, one of them illustrative of an embodiment of the invention capable of serving both purposes is shown in the drawings, merely for the purpose of illustration but without limitation.

As shown in FIG. 2, a novel valve 24 is coupled with said mixing chamber 14 through a conduit or pipe 22 to provide a novel combination of this invention. Said valve 24 comprises a hollow body 30 including a central projection 26 whose inner face terminates a small distance inwardly from a face thereof which acts as a seat for a diaphragm 28. The body 30 has a pair of passageways, with the upper one as shown communicating with the inlet tube 22 and the lower one as shown communicating with a discharge tube 32. The diaphragm 28 extends across said face of body 30 and a bonnet 27 is disposed on the other side of said diaphragm. A plurality of bolts secure together these elements 27, 28 and 30. In assembled condition, there is provided a restricted passageway or zone 25 by the face of projection 26 and the inner face of diaphragm 28, and the zone 25 communicates with inlet and outlet openings in body 30 to create a Venturi tube. The body 30 and the bonnet 27 are rigid and composed of cast-iron, steel or the like. The diaphragm 28 in this specific embodiment in a flexible imperforate material and preferably such a material which is resilient or elastic, as for example, a rubbery material, which in one of its forms may be natural or synthetic rubber, and in all cases, of course, is impervious and inert with respect to the materials contacting it. In the particular embodiment shown diaphragm 28 is composed of elastic or resilient butyl rubber of the type and thickness currently employed as inner tubes for tires.

The bonnet 27 has a central opening therethrough. Mounted in said central opening of said bonnet and extending therefrom is a flexible rubber tube of considerable length of 10 to 50 ft. or more. Said tube 34 communicates with a chamber 29 provided by the bonnet 27 and the outside surface of diaphragm 28. The other end of the flexible rubber tube 34 is connected to a stationary pressure gauge 36, which is attached to a fluid pressure line including therein a stationary control valve 38 and connected to a source (not shown) of fluid under pressure. The mixer 14, together with the novel valve 24, connector 22 and discharge tube 32 may be reciprocated back and forth in unison without disturbing the gauge 36 or the valve 38, which are stationary, due to the use of the long flexible hose 34, so that the position of the valve 38 and the gauge 36 are always maintained in fixed position close to each other as shown so that the operator may, when he desires, actuate the valve 38 and view gage 36 without stoppage of the apparatus.

The fluid under pressure supplied to the chamber 29 is generally air under pressure, although other gases or even liquids may be substituted therefor. The valve 38 serves as an easily operable, ready and convenient means for varying the pressure of the fluid in the fluid line and passing through tube 34 into the bonnet 27. Due to the particular fluid pressure employed and readable on the gauge 36, the operator may at will vary the size or cross sectional area of the restricted passageway or zone 25.

The operation of the apparatus, including novel combinations and novel devices of the present invention capable of effecting the novel processes and steps in the processes of the present invention, is as follows: The mixture of components from mixing chamber 14 is fed downwardly therefrom into and through conduit 22, and into and through the upper or inlet opening of valve 24, then into and through the restricted zone or passageway 25, then into and through the lower or exit passageway of valve 24, and into and through the discharge tube 32 and from there the resultant liquid reaction mass, containing gaseous particles liberated in the course of reaction, passes into moving pans or other convenient means wherein the liquid becomes converted from the liquid state into solid foamed resin.

If the cell size of the foamed resin produced is not that which is desired, while the process continues, the operator merely actuates the control valve 38 to change the fluid pressure exerted against the outside of the diaphragm 28 to change the size of the restricted zone or opening 25 to produce solid foamed resin of the desired cell size.

In the course of the reactants in the mixer 14 being mixed together with the aid of the rotating stirrer 16 and thereafter in the course of travel of said mix through the various passages, reaction is initiated and continues together with evolution of gaseous $CO_2$, and in addition even after the discharge of the $CO_2$ laden liquid reaction mass from the discharge pipe 32 into a container, reaction continues whereupon the mass is converted from the liquid state so a solid foamed resin. As the reaction mass passes into and through the restricted passageway or zone 25, due to varying or fluctuating conditions encountered in normal factory practice, there may be effected in said mass, which is continuing to react together with evolution of $CO_2$ gas, variations in pressure against the interior face of said diaphragm 28. Due to the resiliency or elasticity of the diaphragm 28 per se, or due to its flexibility and resiliency imparted thereto by virtue of the air cushion therebehind, the diaphragm 28 automatically moves back and forth in response to such variations in pressure therein as said mixture reacts and evolves $CO_2$ in its passage therethrough, thereby acting as means which automatically expands and contracts in response to such variations in pressure which are relatively small and difficult to measure. In fact, said diaphragm 28 acting together with the inner face of projection 26 provides a restricted passageway or zone which is capable of automatically expanding and contracting in response to such pressure variations. Consequently, due to such automatic expansion and contraction of zone 25, due to such pressure variations, it is possible to obtain greater uniformity of cell size in the finished product. Said automatically expandable and contractable zone 25, responsive to such pressure variations, in certain instances will compensate therefor, thereby providing a self compensator or self-regulator whereby substantially uniform cell structure may be continuuosly obtained. The advantage of this embodiment is that the operator is called upon only to adjust for greater variations which he may correct by manipulating valve 38.

When, as sometimes occurs, the variations in conditions are such as not to be effectively compensated for by the diaphragm 28 per se, the operator, observing in the course of a run that the cell size has changed so as to be very near a limit or to be without the desired limits thereof, he, without any stoppage whatever of the apparatus, merely adjusts the valve 38 to either decrease or increase the air pressure against the outside of the diaphragm 28 to the desired degree and as conditions demand to decrease or increase the size or cross section of zone 25, to produce solid foamed resin that meets the specification. When it is desired to produce foamed resin of a different cell size than that being produced, even in this instance, neither the operation nor the apparatus need be stopped. All that the operator need do is merely to actuate the control valve 38, whereby the pressure of the fluid against the outside of the diaphragm 28 is either increased or decreased to reduce or increase the size of the restricted passageway or zone 25, as the case may be, to produce foamed resin of the now desired cell size.

The combination, as described and as shown in the drawings, affords devices, apparatus and methods for continuously producing plastic foamed resins of preselected uniform cell size and also affords devices, apparatus and processes which may be readily and easily controlled for continuous operation and at the same time maintaining substantial uniformity of cell size, and in addition, even while the operation is continuous, the apparatus is capable of change to produce foamed resin of a particular cell size for a certain period, and then when desired, without any stoppage whatever, continuously produce foamed resins of uniform and other desired preselected cell size.

The theory of operation we believe to be as follows: The valve 24 is set by the setting of the control valve 38 and the magnitude of fluid pressure in bonnet 29 is evidenced by reading on gage 36. In other words, a constant air pressure, whose magnitude may be ascertained by reading the gage 36, is exerted upon that side of diaphragm 28 covered by the bonnet 29. In view of the constriction of passageway 25 as defined by projection 26 and diaphragm 28, the volume available for the flow of the reaction mass is decreased, the velocity is increased and the pressure is decreased. Hence, the pressure in passageway 25 would be less than that in mixing chamber 15, whereupon micro-sized bubbles or particles of $CO_2$ gas in the reaction mass may increase more rapidly and more uniformly than if they were allowed to grow with no control. Thus by regulating the control valve 38 air pressure against diaphragm 28 is controlled so that the air pressure on diaphragm 28 and the volume or cross sectional area of zone 25 may be maintained fairly constant in order to produce a foamed resin having a predetermined cell size.

Although the air pressure against diaphragm 28 is maintained fairly constant and is of a magnitude set and determined by the control valve 38, the pressure exerted against the other side of the diaphragm 28 tends to vary due to normal factory encountered variations in pressure of the reaction material passing through zone 25 and sometimes such changes, in the absence of such flexible diaphragm, would result in the ultimate production of irregular and non-uniform and sometimes too fine cell structure in the foamed resin produced. However, due to the fact that the diaphragm 28 is flexible and is per se resilient or resilient because of the air pressure thereagainst, the valve 24 has the unexpected and surprising function of acting as a self-compensator or self-regulator actuable in response to pressure variations in zone 25 whereby the zone automatically expands and contracts and apparently the diaphragm 28 moves back and forth frequently to compensate for frequent variations in the pressure of said reaction mass passing through zone 25 so that the cell size of the ultimate foamed resin produced is maintained substantially uniform and between certain fixed limits.

If, for instance, the volume of the reaction mass entering said zone 25 per unit of time is decreased, the velocity and pressure of the mass passing therethrough are respectively increased and decreased. This is accomplished by diaphragm 28, under the greater constant pressure exerted from chamber 29 moving towards projection 26 thereby narrowing zone 25 at this point. This reduction in size of zone 25 causes the velocity of the mass to increase and the pressure to decrease thereby compensating for the fluctuation.

Conversely, if for instance, the volume of such mass entering the zone 25 per unit of time should increase, the pressure therein would decrease thereby resulting in too rapid cell growth. However, the resultant pressure in zone 25 due to build up of material therein is exerted upon the diaphragm 28 and will move diaphragm 28 thereby enlarging the size of the zone 25, and as a consequence of such enlargement or increase in cross sectional area of said zone, the velocity of the mass passing therethrough is decreased and the pressure thereof increased, thereby restricting the cell growth and compensating for such fluctuation.

Of course, as before stated, when, as sometimes happens, the variation in conditions is so great or of such character as to be incapable of being corrected by said self-compensator or self-regulator, the operator, without any stoppage whatever, merely actuates the valves 38 to either increase or decrease the air pressure on the bonnet side of diaphragm 28 to decrease or increase the size or cross sectional area of zone 25 so that foamed resin of the desired cell size is obtained.

Our novel process and apparatus have been described as used with the process of, as well as the apparatus disclosed in, the aforementioned Hoppe et al. patent. It is, of course, understood that our process is not limited to this particular process of mixing the components nor to the apparatus disclosed by Hoppe et al. for carrying out such mixing. Neither is our process limited to the particular apparatus described herein, nor, on the other hand, is our novel apparatus useful solely in this process.

As pointed out previously, Hoppe et al. are concerned with improved mixing of the various components. They provide for the introduction of a catalyst into a reaction mixture which comprises a polyisocyanate and polyester or polyether in a fine state of subdivision and at a pressure higher than that of the reaction mixture. This mixing procedure is carried out before reaction occurs. According to one embodiment of their invention, the catalyst mixture is introduced or injected intermittently into a continuous stream of polyisocyanate and polyester or polyether, which stream is advanced by means such as a gear pump system. To insure adequate penetration of the activator mixture into the reaction mixture, the intermittent feed enters through a nozzle or nozzles at a relatively high pressure and frequency. In a preferred embodiment the two reaction components of the reaction mixture, namely at least one diisocyanate and at least one polyester containing hydroxyl groups, are conveyed separately to a mixing device into which they are injected under pressure through separate nozzles or a common mixing nozzle and the catalyst mixture is either conveyed separately to the reaction device and injected into it under pressure through a separate nozzle or a common mixing nozzle. In another embodiment the catalyst may be conveyed to the mixing device in admixture with the polyester, said mixture being injected intermittently into the mixer either through a common mixing nozzle with the isocyanate or through a separate nozzle.

In the practice of Hoppe et al. in its preferred form, the components employed in the manufacture of the resin are forced into a common mixing device by means of pumps. One of the pumps operates continuously while the other pumps operate intermittently. All of the pumps are connected to the mixing device into which one component is introduced continuously while the catalyst or preferably the catalyst and the polyisocyanate are introduced intermittently. The components conveyed by the pumps are introduced by means of nozzles into the reaction or mixing device which has outlet means through which the final mixture is discharged in the liquid state.

Thus, the apparatus of Hoppe et al. comprises, in combination, an enclosed mixer and means through which the components (i.e., polyester or polyether containing free hydroxyl groups, polyisocyanate and catalyst) used in the manufacture of the resin are brought together in said mixer, at least one of said means comprising an injector operating at a pressure substantially higher that that in said mixer, and outlet means through which the final uniform mixture of components is discharged in the liquid state.

As a specific embodiment of Hoppe et al., the apparatus may comprise in combination an enclosed mixer, means to effect a continuous flow of initial materials, i.e., polyisocyanate and polyester or a polyisocyanate modified polyester or polyisocyanate polyether mixture to the mixer, means for feeding the catalyst and/or polyisocyanate and means for intermittently injecting at high frequency the catalyst and/or polyisocyanate in precise quantities into a continuous stream of the initial materials by means of at least one injection nozzle.

The initial material or materials and the catalyst are stored in tanks and conveyed to the mixing device by means of pumps which operate continuously and intermittently as indicated above. The mixing device may contain separate compartments or chambers for injection of the components and mixing or it may be constructed so that both injection and mixing are carried out in a single compartment. In the single chamber mixer, the three components, i.e., the polyisocyanate, polyester and catalyst are preferably conveyed by their respective pumps through separate nozzles into the mixer which preferably contains stirring means.

Mixing time may be varied depending on the proportions and character of the components employed as well as the type of resin desired. Normally the mixing time is in the range of 0.5 to 25 seconds, although longer or even shorter mixing periods may in some cases be desirable.

Concerning the introduction of the catalyst or a mixture of the catalyst plus isocyanate, a relatively high velocity is used so that it will adequately penetrate the high viscosity polyester and form a uniform mixture. This is effected by means of an injection nozzle through which the catalyst or catalyst-isocyanate mixture is introduced at a pressure in the range of about 1200 p.s.i. to about 5250 p.s.i. However, Hoppe et al. contemplate the use of injection pressures which are higher and preferably substantially higher than the back pressure within the reaction or mixing device. Normally, the back pressure within the device is of the order of from 45 p.s.i. to 75 p.s.i. depending upon the viscosity of the material and the size of the discharge outlet. In the case of low viscosity materials, the back pressure may drop to as low as 17 p.s.i., but with more highly viscous materials, it may increase to much higher values than are normally encountered. As to the frequency of the injection of the catalyst or catalyst plus isocyanate, an injection rate of about 50 to 10,000 or preferably about 2,000 to 10,000 injections per minute are carried out. However, we have found that even a continuous injection may be used instead so long as the pressure of the injected component is substantially in excess of the pressure of the other component and thorough mixing of the components is attained.

The following examples are given merely to illustrate specific methods and apparatus embodying the invention which are not to be taken by way of limitation:

EXAMPLE I

A polyester was first prepared in the following manner: 83 mols of diethylene glycol, 76 mols of adipic acid, and 1.34 mols of trimethylol propane were mixed together and heated at an ambient temperature of from 150° to 440° F. for approximately 4 hours. The acid number of the resulting polyester was <1.0. The hydroxyl number was between 50 and 55. The water content was <0.1% by weight of the polyester.

Tank 6 was then charged with this polyester while tank 2 was charged with m-toluene di-isocyanate and tank 10 was charged with a catalyst mixture comprising 3.0 parts by weight of N-ethyl morpholine, 1.0 part by weight of A–3 (an aliphatic amine-ethylene oxide condensate prepared by Mobay Chemical Company), 1.5 parts by weight of Witco 77–86 (an arylethylene oxide condensate prepared by Witco Chemical Company) and 3.6 parts by weight of water. Tanks 2 and 10 were maintained at room temperature while tank 6 was maintained at a temperature between 60 and 70° F.

Control valve 38 was adjusted so that air pressure of 10 p.s.i. was maintained upon diaphragm 28.

The toluene di-isocyanate was pumped by pump 4 at a rate of 4 pounds per minute, the catalyst mixture was pumped by pump 12 at a rate of 1.5 pounds per minute and the polyester was pumped by pump 8 at a rate of 10 pounds per minute to mixer 14. The polyester was pumped continuously while the diisocyanate and catalyst were injected into mixer 14 at a rate of 7200 injections per minute and 2400 injections per minute respectively. The above reaction mixture was thoroughly mixed in mixer 14 for about 1.5 seconds. The ratio of the components as admixed in the mixer was 15.5 pounds polyester, 7.25 pounds isocyanate, and 1.5 pounds catalyst. Thereafter the mixture which had begun to react and to evolve carbon dioxide was discharged from mixer 14 through pipe 22, valve 24, and pipe 32 from which a liquid, gaseous $CO_2$ laden, reaction mass was finally discharged into a movable conveyor (not shown) and wherein it was converted into a solid foamed resin. While the reaction mass traveled through passage or zone 25, the pressure in passage 25 was maintained at a substantially constant value based on the original adjustment of valve 38 and due to compensatory movement of diaphragm 28 both towards and away from projection due to variations in pressure of said material on the other side of diaphragm in the course of the passage of said mass through said zone, cell size uniformity was automatically maintained. The resulting flexible foamed resin had a regular and uniform cell structure of approximately 1/40 of an inch in diameter. The density of the product was 2.0 pounds per cubic foot.

EXAMPLE II

Tank 6 was charged with the polyester of Example I while tank 2 was charged with m-toluene diisocyanate and tank 10 charged with a catalyst mixture containing 1.8 parts by weight n-ethyl morpholine, 2.2 parts by weight n-coco morpholine, 5.3 parts by weight of emulsifier and 2.1 parts by weight water. Tanks 2 and 10 were maintained at room temperature while tank 6 was maintained at a temperature between 60° and 70° F.

Control valve 38 was adjusted so that air pressure of 5 p.s.i. was maintained upon discharge 28.

The toluene diisocyanate was pumped by pump 4 at a rate of 3.2 pounds per minute, the catalyst mixture was pumped by pump 12 at a rate of 0.89 pound per minute while the polyester was pumped by pump 8 at a rate of 10 pounds per minute to mixer 14. The polyester was pumped continuously while the diisocyanate and catalyst were injected into mixer 14 at a rate of 7,200 injections per minute and 1200 injections per minute respectively. The above reaction mass was thoroughly mixed in mixer 14 for about 1.5 seconds. The weight ratio of the components as admixed in the mixer was 100 parts polyester, 32 parts isocyanate and 8.9 parts catalyst. Thereafter the mixture which had begun to react and to evolve carbon dioxide was discharged from mixer 14 through pipe 22, valve 24, and discharge tube 32 from which a liquid, gaseous $CO_2$ laden, reaction mass was finally discharged into a moving conveyor (not shown) wherein it was converted into a solid foamed resin. While the reaction mass traveled through passage 25, the external pressure in passage 25 was maintained at a substantially constant value based on the original adjustment of valve 38 and due to such compensatory movement of diaphragm 28 both towards and away from projection 26 due to variations in pressure on the other side of and capable of being automatically corrected by said diaphragm in the course of the passage of said reaction mass through said zone, uniformity of cell size was automatically maintained. The resulting flexible foamed resin had a regular and uniform cell structure of approximately 1/60 of an inch in diameter. The density of the product was 3 pounds per cubic foot.

EXAMPLE III

Tank 6 was charged with the polyester of Example I while tank 2 was charged with m-toluene diisocyanate and tank 10 charged with a catalyst mixture containing 1.5 parts by weight of m-methyl morpholine, 2.1 parts by weight n-coco morpholine, 3.9 parts by weight emulsifier and 1.2 parts by weight water. Tanks 2 and 10 were maintained at room temperature while tank 6 was maintained at a temperature between 60° and 70° F.

Control valve 38 was adjusted so that a pressure of 7 p.s.i. was maintained upon diaphragm 28.

The toluene diisocyanate was pumped by pump 4 at a rate of 2.3 pounds per minute, the catalyst mixture was pumped by pump 12 at a rate of 0.62 pound per minute while the polyester was pumped by pump 8 at a rate of 10 pounds per minute to mixer 14. The polyester was pumped continuously while the diisocyanate and catalyst were injected into mixer 14 at a rate of 7,200 and 1,200 injections per minute respectively. The above reaction components were thoroughly mixed in mixer 14 about 1.5 seconds. The ratio of components as admixed in the mixer was 100 parts by weight polyester, 23 parts by weight isocyanate and 6.2 parts by weight catalyst. Thereafter the mixture which had begun to react and to evolve carbon dioxide was discharged from mixer 14 through pipe 22, valve 24 and pipe 32 from which a liquid, gaseous $CO_2$ laden, reaction mass was finally discharged into a moving conveyor (not shown) wherein it was converted into a solid foamed resin. While the reaction mass traveled through passage 25, the external pressure in passage 25 was maintained at a substantially constant value based on the original adjustment of valve 38 and due to compensatory movement of diaphragm 28 both towards and away from projection 26 due to variations in pressure on the other side of and capable of being automatically corrected by said diaphragm in the course of the passage of said reaction mass through said zone, uniformity of cell size was automatically maintained. The resulting flexible foamed resin had a regular and uniform cell structure of approximately 1/80 of an inch in diameter. The density of the product was 5 pounds per cubic foot.

In the preceding examples, the m-toluene diisocyanate comprised the 2,4 and the 2,6 isomers in an 80:20 parts by weight ratio.

It must be appreciated that the operating ranges of the air pressure maintained upon diaphragm 28 will vary depending upon the size of the valve and diaphragm, the material of the diaphragm and the rate of flow of the materials through it. In general, when a 3/4 inch diaphragm valve using a 1/32 inch butyl rubber diaphragm is employed, the pressure maintained upon the diaphragm may vary over wide limits, and may vary from 0 to 50 p.s.i.

In general, the present invention is applicable to the production of foamed plastics, both rigid and flexible, using any of the previously referred to organic compounds having at least two reactable hydrogen atoms and capable of reacting with a polyisocyanate. In one specific embodiment, the invention may be practiced using a polyester having an acid number of from about 0.5 to about 80. As used throughout the specification and in the claims, the expression "polyester" includes any product produced by the reaction of a polyhydric alcohol or mixtures thereof and a polybasic acid or mixtures thereof. The polyesters that are used are prepared from a polyhydric alcohol-polybasic acid mixture in which the ratio of hydroxyl groups to carboxyl groups is within the range of from about 3 hydroxyls: 1 carboxyl to 4 hydroxyls: 5 carboxyls. Thus, for example, polyesters which are well suited for use can be produced by reacting polybasic acids or mixtures thereof, such as succinic acid, adipic acid, sebacic acid, isosebacic acid, azelaic acid, citric acid, lactic acid, phthalic acid, terephthalic acid, etc., or other similar ester-forming compounds, such as phthalic anhydride, maleic anhydride, etc. with appropriate quantities or polyhydric alcohols, such as ethylene glycol, diethylene glycol, triethylene glycol, propylene glycol, 1,4 butylene glycol, glycerol, trimethylol propane, pentaerythritol, mannitol, sorbitol, etc., as well as mixtures thereof. Moreover, in addition to such polyesters, the improved plastic products of the invention can be produced using any of the so-called modified polyesters of the art. Modified polyesters are produced by adding agents, such as, oleic acid, castor oil, linseed oil, resin copal, rosin, etc. to the polybasic acid-polyhydric alcohol formulation prior to converting same, by appropriate means, into the desired polyester.

The method employed in producing the polyesters themselves used in preparing our novel foamed plastic products is not a part of, and, hence, does not limit the scope of, the invention. In general, polyester compositions fully suited for use can be prepared by any of the procedures well known to the art. As indicated heretofore, it is preferred that they be prepared from such quantities of polybasic acids and polyhydric alcohols as will provide a ratio of hydroxyl groups to carboxyl groups in the reaction mixture which is within the range of from about 3 hydroxyls: 1 carboxyl to 4 hydroxyls: 5 carboxyls. Moreover, while in its broadest embodiment, the invention contemplates the use of a polyester having an acid number within the range of from about 0.5 to about 80, the use of a polyester having an acid number of from about 0.5 to about 25 has been found to bring about particularly outstanding results. Furthermore, in the preferred practice of the invention, the polyester used will have a water content of from about 0.1% to about 5.0% by weight. The following examples are formulations employed in producing a few of the polyesters that can be used. When suitably adjusted to an acid number within the range of from about 0.5 to about 80 and, preferably, when adjusted to a water content of from about 0.1% to about 5.0% by weight, any of the following polyesters can be used in producing some of the products of this invention with equally outstanding results. It should be understood, however, that in setting forth these specific formulations, we do not intend to restrict the invention to the use thereof.

*Formula A*

| | Mols |
|---|---|
| Glycerol | 4 |
| Adipic acid | 3 |

*Formula B*

| | |
|---|---|
| Trimethylol propane | 3 |
| Phthalic anhydride | 2 |

*Formula C*

| | |
|---|---|
| Glycerol | 1 |
| Phthalic anhydride | 1.5 |
| Oleic acid | 0.5 |

As has been disclosed above, polyester resins employed in producing the foamed plastic products have a water content within the range of from 0.1% to 5.0% by weight. However, the important consideration is not the presence of the small quantity of water in the resin itself. Rather, it is the presence of the water in the reaction system. It is well known in the art that, although foamed products can be obtained by the reaction of a polyester resin and a polyisocyanate in the absence of water, the presence of small quantities of water in the reaction system contributes greatly to the production of plastic products of decreased density. Use of a water-containing polyester resin is merely a simple expedient for insuring the presence of that quantity of water. Thus, since the manner in which water is incorporated into the reaction system is of no importance whatsoever to the operability of the invention, its presence can be provided for in any one of several ways. The resin to be used can be produced in such a manner that it will contain the quantity of water required by the system for completely satisfactory results or water can be incorporated by suitable means into the resin at some time prior to its use. In addition, the required quantity of water can be incorporated into the reaction mixture in combination with a non-ionic wetting agent or by use of one or more metallic salt hydrates in the manner disclosed in U.S. Patent 2,577,279. Effective non-ionic wetting agents include, among others, alkylated phenoxy polyethoxy ethanols, polyoxyalkylene derivatives of hexitol anhydride partial long chain fatty acid esters and water-soluble hydroxylated resins. The metallic hydrate salts which are similarly effective include sodium acetate trihydrate, manganous chloride tetrahydrate, cupric nitrate hexahydrate, and calcium chloride hexahydrate.

The polyethers which we may use comprise e.g., polyethylene glycols of molecular weight of 1,000; 2,000 and up to 4,000, polypropylene glycols of the same molecular weight and graft polymer mixtures of polyethylene and polypropylene glycols having a molecular weight of 2,000 to 4,000. Ethylene oxide and propylene oxide condensates with amines, glycerine, hexane triol, trimethylol propane, etc., having molecular weights of 2,000 to 4,000 are also useful.

The polyester or polyether employed is reacted with a composition containing more than one isocyanate group and referred to generically as a polyisocyanate. Included within this category are various polyisocyanate compounds, and mixtures thereof, blends containing a polyisocyanate and one or more high molecular weight thermoplastic film-forming additives and polyisocyanate addition products. The polyisocyanate reactant can be replaced either in whole or in part, by a polyisothiocyanate compound. Products having excellent properties and characteristics can be produced by reacting the polyester with a polyisocyanate compound such as metatoluene diisocyanate or with an addition product thereof. Other useful polyisocyanates are other isomers of toluene diisocyanate, e.g., p-toluene diisocyanate, triphenyl diisocyanate, diphenylmethane diisocyanate, ethylene diisocyanate, m- and p-phenylene diisocyanate, propylene 1,2-diisocyanate, and triphenylmethane triisocyanate.

The polyisocyanate addition products that may be used are compositions such as are disclosed in U.S. Patent 2,602,783. These are products produced by reacting a polyisocyanate with a compound, or with a mixture of compounds, having more than one functional group or radical, each of which groups or radicals contains at least one labile hydrogen atom capable of reacting with the polyisocyanate compound by addition polymerization. Examples of compounds containing such reactive groups and radicals are: (1) polyfunctional aliphatic alcohols, such as 2-methyl-2,4-pentanediol; 1,4-hexanediol; 1,5-pentanediol; ethylene glycol; diethylene glycol; etc., (2) polyfunctional phenols, such as resorcinol; pyrocatechol; pyrogallol; etc., (3) bifunctional metal soaps, such as, aluminum monostearate, aluminum monooleate, aluminum monopalmitate, bismuth monostearate, etc. Furthermore, addition products of the type produced by reacting a polyisocyanate compound wtih a polyfunctional amino alcohol such as 2-amino 1-butanol, 1,3-amino 2-propanol, a polyfunctional aliphatic or aromatic amine or a polyfunctional thioglycol can be used. A very useful polyisocyanate is m-tolene diisocyanate containing 4% by weight of ethyl cellulose.

Prepolymers may likewise be used in the reaction mixture. These are reaction products of polyisocyanates with polyethers or polyesters and have present isocyanate groups and hydroxyl groups in a ratio of from 1.05 (NCO):1(OH) to 4(NCO):1(OH).

Our embodiments have been carried out with the employment of catalysts for the reaction between the polyester and polyisocyanate since we have described the procedure of Hoppe et al., supra. However, use of catalysts is optional i.e., polyesters or polyethers and polyisocyanates may be mixed and reacted together in their absence and such a reaction may be handled according to our process for regulating cell structure. Should catalysts be used such may be, for instance, selected from the following materials N-alkyl morpholines, e.g., N-methyl morpholine, N-ethyl morpholine, tertiary amines, e.g., trimethyl amine, triethyl amine, dimethyl hexahydroaniline, diethyl hexahydroaniline, piperazine and derivatives of piperazine.

We have demonstrated our novel process, novel device and novel apparatus for controlling cell structure in conjunction with a mixing procedure an example of which procedure is that described by Hoppe et al., supra and have employed therewith adjustable presettable and self-regulating means, example of which is the novel type of diaphragm valve 24 together with the adjustable air pressure to provide various combinations. It is understood that other mixing procedures may be used in place of the Hoppe et al. procedure and other mechanical means may be used in our process to regulate or control the size and/or uniformity of cell formation. For instance, our process may be accomplished by the use of any adjustable means which can vary flow rates and pressure through a delivery pipe. Such means may be activated by gas, hydraulic, mechanical, electrical or electronic means.

Also, our novel valve may be used in other processes besides our process for controlling uniformity of cell structure. For instance, our valve may be successfully employed to maintain flow pressures of fluids, i.e., liquids and gases, at a constant rate despite fluctuations of delivery pressures and delivery rates. It may also be used to control flow pressures of mixtures of fluids e.g., mixtures of liquids, mixtures of gases, or mixtures of liquids and gases in spite of variations in delivery pressures or rates. Solids may also be present in such fluids or fluid mixtures. The valve need be only preset and will maintain a constant flow pressure continuously and automatically without further manipulation.

It is to be understood that the following claims are intended to cover all the generic and specific features of the invention herein described, and all statements of the scope of the invention, which as a matter of language might be said to fall therebetween.

We claim:

1. The method for producing foamed plastic material comprising mixing together an organic polyisocyanate and an organic compound having at least two reactable hydrogen atoms and capable of reacting with said polyisocyanate with the evolution of carbon dioxide gas for the production of said foamed plastic material and passing the resulting reacting mass accompanied by the evolution of carbon dioxide gas into and through a pressure responsive restricted zone wherein reaction accompanied by the evolution of carbon dioxide gas continues to occur, said zone having a pressure responsive movable member, which member expands and contracts said zone in response to pressure variations exerted therein by successive portions of said reacting mass passing through said zone thereby aiding in maintaining substantially uniform cell size in the ultimate material produced.

2. The method for producing foamed plastic material comprising mixing together an organic polyisocyanate and an organic compound having at least two reactable hydrogen atoms and capable of reacting with said polyisocyanate with the evolution of carbon dioxide gas, for the production of said foamed plastic material, and while a pressure responsive restricted zone is maintained under substantially constant external pressure, passing the resulting reacting mass through said pressure responsive restricted zone wherein reaction occurs and carbon dioxide gas is evolved during the passage of said reacting mass therethrough, said zone having a pressure responsive movable member, which member expands and contacts said zone in response to pressure variations exerted therein by said reacting mass during the passage of said reacting mass therethrough thereby to aid in effecting substantially uniform cell size in the foamed plastic material ultimately procedured and presetting the cross-sectional area of said zone by varying the magnitude of said substantially constant pressure applied externally to said zone while said reacting mass is passing through said zone thereby to effect a change in the cell size of the foamed plastic material ultimately produced.

3. In a method for continuously obtaining foamed polyurethane plastic material, the steps comprising, in the course of reaction of a mass comprising an organic polyisocyanate and an organic compound having at least two reactable hydrogen atoms and capable of reacting with said polyisocyanate and accompanied by carbon dioxide gas evolution and ultimate conversion of said reaction mass into a foamed polyurethane plastic organic reaction material, and while a pressure responsive restricted zone is maintained under substantially constant external pressure, continuously passing said reacting mass accompanied by carbon dioxide gas evolution through said pressure responsive restricted zone having a pressure responsive movable member, which member expands and contracts the cross-sectional area of said zone in response to variations in pressure exerted therein by said reacting mass accompanied by carbon dioxide gas evolution in the continuous passage thereof into and through said zone, thereby to aid in effecting substantially uniform cell size in the foamed plastic material ultimately produced and presetting the cross-sectional area of said zone by varying the magnitude of said pressure applied externally to said zone while said reacting mass is passing therethrough thereby to effect a change in the cell size of the foamed plastic material ultimately produced, said cross-sectional area being transverse to the path of travel of said reacting mass through said zone.

4. In a method for continuously obtaining foamed polyurethane plastic material the steps comprising, in the course of reaction of a mass comprising an organic polyisocyanate and an organic compound having at least two reactable hydrogen atoms and capable of reacting with said polyisocyanate and accompanied by carbon dioxide gas evolution and ultimate conversion of said reaction mass into a foamed polyurethane plastic organic reaction material, and while a pressure responsive restricted zone is maintained under substantially constant external pressure, continuously passing said reacting mass accompanied by carbon dioxide gas evolution through a pressure responsive restricted zone having a pressure responsive movable member, which member increases and decreases the cross-sectional area of said zone in repsonse to variations in pressure exerted therein by respective portions of said reacting mass accompanied by carbon dioxide gas evolution in the continuous passage thereof into and through said zone thereby to aid in effecting substantially uniform cell size in the foamed polyurethane plastic material ultimately produced, said cross-sectional area being transverse to the path of travel of said reacting mass through said zone.

5. A process for obtaining foamed polyurethane plastic material comprising the steps of (1) intimately admixing a plurality of reactants capable of reaction to produce polyurethane resin and carbon dioxide gas and (2) while a pressure responsive restricted zone is maintained under substantially constant external pressure, continuously passing the resulting reacting mass in which carbon dioxide gas is being produced into and through said pressure responsive restricted zone having a pressure responsive movable member, which member expands and contracts the cross-sectional area of said zone transverse to the path of travel of said reacting mass through said zone in response to pressure variations exerted therein by said reacting mass in the passage of said reacting mass through said zone thereby to aid in maintaining substantially uniform cell size in the foamed polyurethane plastic material ultimately produced, said reactants comprising a polyisocyanate and an organic compound having at least two reactable hydrogen atoms and capable of reacting with said polyisocyanate.

6. A continuous process for obtaining foamed polyurethane plastic materials comprising the steps of (1) intimately admixing a plurality of components capable of reacting together in the production of polyurethane resin and carbon dioxide gas thereby to initiate said reaction, (2) while a pressure responsive restricted zone is maintained under substantially constant external pressure, passing the resulting reacting mass into said pressure responsive restricted zone wherein reaction together with the production of carbon dioxide continues, said zone having a pressure responsive movable member, which member expands and contracts the cross-sectional area of said zone in response to pressure variations exerted therein between portions of said reacting mass passing into said zone thereby to aid in maintaining substantially uniform cell size in the ultimate foamed plastic material produced, and (3) presetting the cross-sectional area of said zone by varying the magnitude of said external substantially constant pressure applied externally to said zone while said reacting mass is passing through said expandable and contractable zone, thereby to aid in effecting a change in the substantially uniform cell size of the foamed plastic material ultimately produced, said cross-sectional area being transverse to the path of travel of said reacting mass through said zone, said components comprising a polyisocyanate and an organic compound having two reactable hydrogens and capable of reacting with said polyisocyanate.

7. In a method for continuously obtaining a foamed polyurethane resinous material, the step comprising while a pressure responsive restricted zone is maintained under substantially constant external pressure, passing a mixture of reactants, comprising a polyisocyanate and an organic compound having two reactable hydrogens into and through said pressure responsive restricted zone wherein reaction occurs between said reactants and carbon dioxide gas is evolved, said reactants being capable of reacting together in the course of ultimately producing said foamed polyurethan resinous material therefrom, said zone having a pressure responsive movable member, which member expands and contracts said zone transversely of the path of travel of said mass through said zone in responsive to pressure variations exerted therein by said reacting mass in the course of the continuous passage therethrough of said reacting mass, thereby to aid in effecting substantially uniform cell size in the foamed plastic material ultimately produced.

8. In a method for continuously obtaining foamed polyurethane plastic material, the step comprising while a pressure responsive restricted zone is maintained under substantially constant external pressure, passing a reacting mass accompanied by carbon dioxide gas evolution into and through said zone in the course of said foamed polyurethane plastic material being ultimately produced therefrom, said zone having a pressure responsive movable member, which member expands and contracts the cross-sectional area of said zone in response to variations in pressure exerted therein by successive portions of said reacting mass accompanied by gas evolutions passing into and through said zone thereby to aid in maintaining substantially uniform cell size in successive portions of the foamed polyurethane plastic material thereafter ultimately produced from said reacting mass, said cross-sectional area being transverse to the path of travel of said reacting mass passing through said zone, said reacting mass accompanied by the evolution of carbon dioxide being produced in the course of reaction of a plurality of components capable of ultimately producing said foamed polyurethane plastic material, at least two of said components being (a) an organic polyisocyanate and (b) a compound capable of reacting with said polyisocyanate in the production of polyurethane plastic material.

References Cited in the file of this patent
UNITED STATES PATENTS

| | | |
|---|---|---|
| 2,764,565 | Hoppe et al. | Sept. 25, 1956 |
| 2,885,268 | Breer et al. | May 5, 1959 |
| 2,948,928 | Ebneth et al. | Aug. 16, 1960 |

FOREIGN PATENTS

| | | |
|---|---|---|
| 858,745 | France | May 20, 1940 |

UNITED STATES PATENT OFFICE
CERTIFICATION OF CORRECTION

Patent No. 2,990,380　　　　　　　　　　　　　　　　　　June 27, 1961

Bertram J. Auerbach et al.

It is hereby certified that error appears in the above numbered patent requiring correction and that the said Letters Patent should read as corrected below.

Column 4, line 7, for "in", second occurrence, read -- is --; column 5, line 2, for "so" read -- to --; line 29, for "continuuosly" read -- continuously --; column 7, line 48, for "that", first occurrence, read -- than --; column 9, line 22, for "discharge" read -- diaphragm --; column 10, lines 47 and 48, for "hydroxyls;" read -- hydroxyls: --; column 12, line 43, for "m-tolene" read -- m-toluene --; column 13, line 57, for "procedured" read -- produced --; column 15, line 20, for "polyurethan" read -- polyurethane --.

Signed and sealed this 5th day of December 1961.

(SEAL)
Attest:

ERNEST W. SWIDER
Attesting Officer

DAVID L. LADD
Commissioner of Patent: